(12) United States Patent
Ohtsuka et al.

(10) Patent No.: US 7,531,974 B2
(45) Date of Patent: May 12, 2009

(54) APPARATUS AND METHOD FOR CONTROLLING A MOTOR

(75) Inventors: Hideaki Ohtsuka, Yokohama (JP); Hidehiko Sugita, Zama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 585 days.

(21) Appl. No.: 10/575,203

(22) PCT Filed: Dec. 14, 2005

(86) PCT No.: PCT/IB2005/003774

§ 371 (c)(1),
(2), (4) Date: Apr. 10, 2006

(87) PCT Pub. No.: WO2006/097789

PCT Pub. Date: Sep. 21, 2006

(65) Prior Publication Data

US 2008/0297087 A1    Dec. 4, 2008

(30) Foreign Application Priority Data

Dec. 15, 2004  (JP) .............................. 2004-362451
Nov. 11, 2005  (JP) .............................. 2005-327148

(51) Int. Cl.
*H02P 27/08*  (2006.01)
*H02P 6/06*  (2006.01)

(52) U.S. Cl. ...................... 318/146; 318/151; 318/158; 318/453; 318/465; 318/504

(58) Field of Classification Search ................. 318/140, 318/141, 146, 151, 158, 452–455, 461, 465, 318/478, 479, 500, 504
See application file for complete search history.

(56) References Cited

U.S. PATENT DOCUMENTS

| | | | | |
|---|---|---|---|---|
| 4,047,083 A | * | 9/1977 | Plunkett | ...................... 318/807 |
| 4,377,779 A | * | 3/1983 | Plunkett | ...................... 318/811 |
| 4,926,104 A | | 5/1990 | King et al. | |
| 5,517,064 A | * | 5/1996 | Murakami | ................. 307/10.1 |
| 5,801,497 A | * | 9/1998 | Shamoto et al. | ............. 318/139 |
| 5,998,880 A | * | 12/1999 | Kumar | ..................... 290/40 B |
| 6,977,478 B2 | | 12/2005 | Biamonte et al. | |
| 2005/0061567 A1 | * | 3/2005 | Kim | ........................... 180/243 |

FOREIGN PATENT DOCUMENTS

JP      2004-072954     3/2004

* cited by examiner

*Primary Examiner*—Bentsu Ro
(74) *Attorney, Agent, or Firm*—Young Basile (57) ABSTRACT

A motor control device is disclosed that reduces the shock caused by torque increase during switching output of a motor's power generator from PWM wave voltage driving to square-wave voltage driving. Switching of PWM wave voltage driving and square-wave voltage driving is determined based on rotation speed of the motor and a torque instruction value. When switching from PWM wave voltage driving to square-wave voltage driving occurs, the voltage output of the power generator is reduced. When generated voltage V drops below a specified threshold voltage, PWM wave voltage driving is switched to square-wave driving.

27 Claims, 7 Drawing Sheets

APPARATUS AND METHOD FOR CONTROLLING A MOTOR

BACKGROUND

The present invention relates to the field of control of AC motors and in particular to control of AC motors used in vehicles.

Japanese Kokai Patent Application No. 2004-72954 discloses a conventional motor control device, in which the DC power of a battery is converted into AC power and supplied to a motor. Switching is performed between square-wave voltage driving that applies a square-wave voltage to the motor for driving control and pulse width modulation (PWM) wave voltage driving that applies a PWM wave voltage to the motor for driving control corresponding to the rotation speed of the motor and a torque instruction value.

Since square-wave voltage driving has a higher duty ratio than PWM voltage driving, the voltage needed for generating the same torque is lower than that of PWM voltage driving. Consequently, in the aforementioned conventional motor control device, when PWM voltage driving is switched to square-wave voltage driving, the current sharply increases instantaneously. As a result, the torque increases significantly, causing a shock.

SUMMARY

In accordance with one aspect of the invention, a motor control device for use in controlling an electric motor driven by a power generator that is adapted to output a square-wave voltage and a PWM wave voltage in response to a switching control signal. The motor control device includes a first input signal indicative of a torque instruction value; a second input signal indicative of the rotational speed of the electric motor; and a controller. The controller is adapted to: determine the existence of a switching condition based on the first and second inputs; if a switching condition exists, generate a voltage control signal to lower the output voltage of the power generator; when the output voltage of the power generator is below a specified voltage level, generate the switching control signal to cause the power generator output to switch from the PWM-wave voltage output to the square-wave voltage output.

In accordance with another aspect of the invention, a method is provided to control an electric motor that is driven by a power generator that is adapted to output a square-wave voltage and a PWM wave voltage. The method includes determining whether a switching condition exists based on the rotation speed of the electric motor and a torque instruction value; lowering the voltage output of the power generator if a switching condition exists; and switching the output of the power generator from PWM-wave voltage to square-wave voltage if a switching condition exists and the output of the power generator is below a specified level.

BRIEF DESCRIPTION OF THE FIGURES

The description herein makes reference to the accompanying drawings wherein like reference numerals refer to like parts throughout the several views, and wherein.

DETAILED DESCRIPTION

In the embodiments disclosed below, a motor control device is provided which can reduce the shock caused by torque increase when switching from PWM voltage driving to square-wave voltage driving. As explained below, the motor control device uses a switching judgment means to identify switching between PWM wave voltage driving and square-wave voltage driving based on the rotation speed of the motor and a torque instruction value. When switching from PWM wave voltage driving to square-wave voltage driving is identified by the switching judgment means, the generated voltage of the generator is lowered by a voltage lowering means. When the generated voltage of the generator is below a specified threshold voltage level, switching from PWM wave voltage driving to square-wave voltage driving is performed by a square-wave switching means.

Because switching from PWM wave voltage driving to square-wave voltage driving is performed after the generated voltage of the generator is lowered, the shock caused by the occurrence of torque increase during switching can be reduced.

In the following, embodiments of the present invention will be explained based on the figures.

Figure 1:
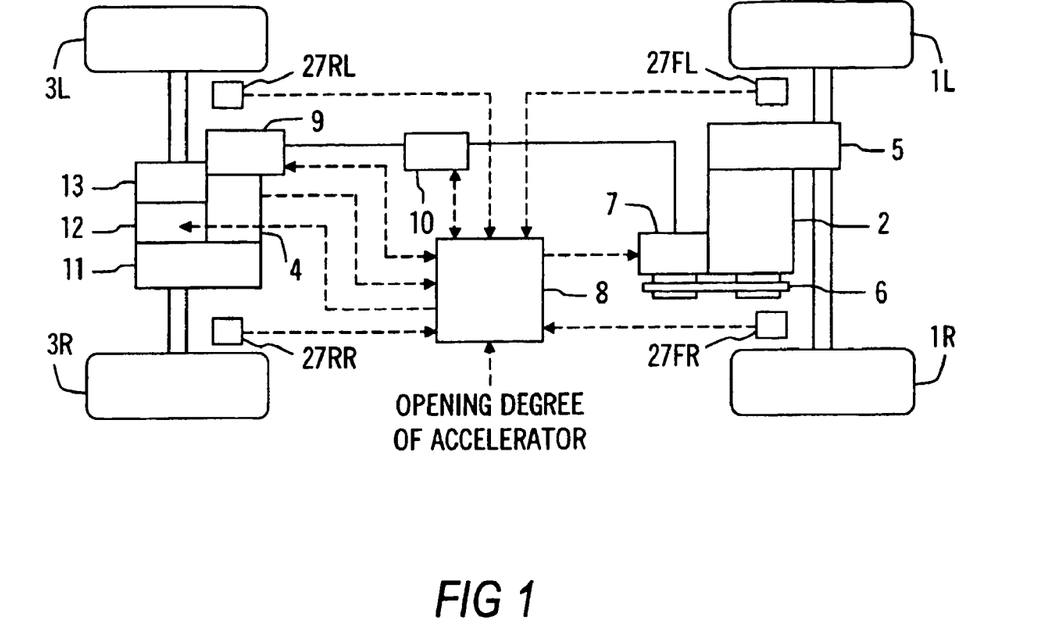
FIG. 1 is a schematic diagram illustrating a first embodiment of the present invention.

FIG. 1 is a schematic diagram illustrating a case when the present invention is applied to a four-wheel drive vehicle.

As shown in FIG. 1, the left and right front wheels 1L, 1R of the vehicle used in this embodiment are primary driving wheels driven by an internal combustion engine 2, and left and right rear wheels 3L, 3R are secondary driving wheels that can be driven by a motor 4.

For example, a main throttle valve and a sub-throttle valve are installed in the gas inlet pipe of the engine 2. The main throttle valve adjusts and controls the throttle opening degree corresponding to the distance the accelerator pedal is pressed down. The sub-throttle valve adjusts and controls the opening degree depending on the rotation angle corresponding to the step number of a step motor, etc. used as an actuator. Consequently, when the throttle opening degree of the sub-throttle valve is adjusted to or below the opening degree of the main throttle valve, the output torque of the engine can be reduced independently of the driver's operation of the accelerator pedal. That is, the adjustment of the opening degree of the sub-throttle valve can control the driving force to suppress the acceleration slippage of front wheels 1L, 1R caused by engine 2.

The output torque Te of the engine 2 is transferred to left and right front wheels 1L, 1R through transmission and a differential gear 5. Part of the output torque Te of engine 2 is transferred via an endless belt 6 to a power generator 7 acting as a power supply. Power generator 7 rotates at a rotation speed Nh calculated by multiplying a pulley ratio by the rotation speed Ne of engine 2.

The aforementioned power generator has a voltage regulator (regulator) used to adjust the output voltage. The power generator becomes the load with respect to engine 2 corresponding to field current Ifh adjusted by 4WD controller 8 and generates a voltage corresponding to its load torque. The rotation speed Nh of power generator 7 can be calculated based on the pulley ratio from the rotation speed Ne of engine 2. The power generated by power generator 7 can be supplied to motor 4 via an junction box 10 and an inverter 9. The drive shaft of the motor 4 can be connected to rear wheels 3L, 3R via a decelerator 11, clutch 12 and differential gear 13.

In junction box 10, there is a relay that can engaged/disengage inverter 9 and power generator 7. When the relay is connected, the AC power supplied from power generator 7 is rectified to DC power by a rectifier not shown in the figure. This is converted into three-phase current in inverter 9 to drive motor 4.

Figure 2:
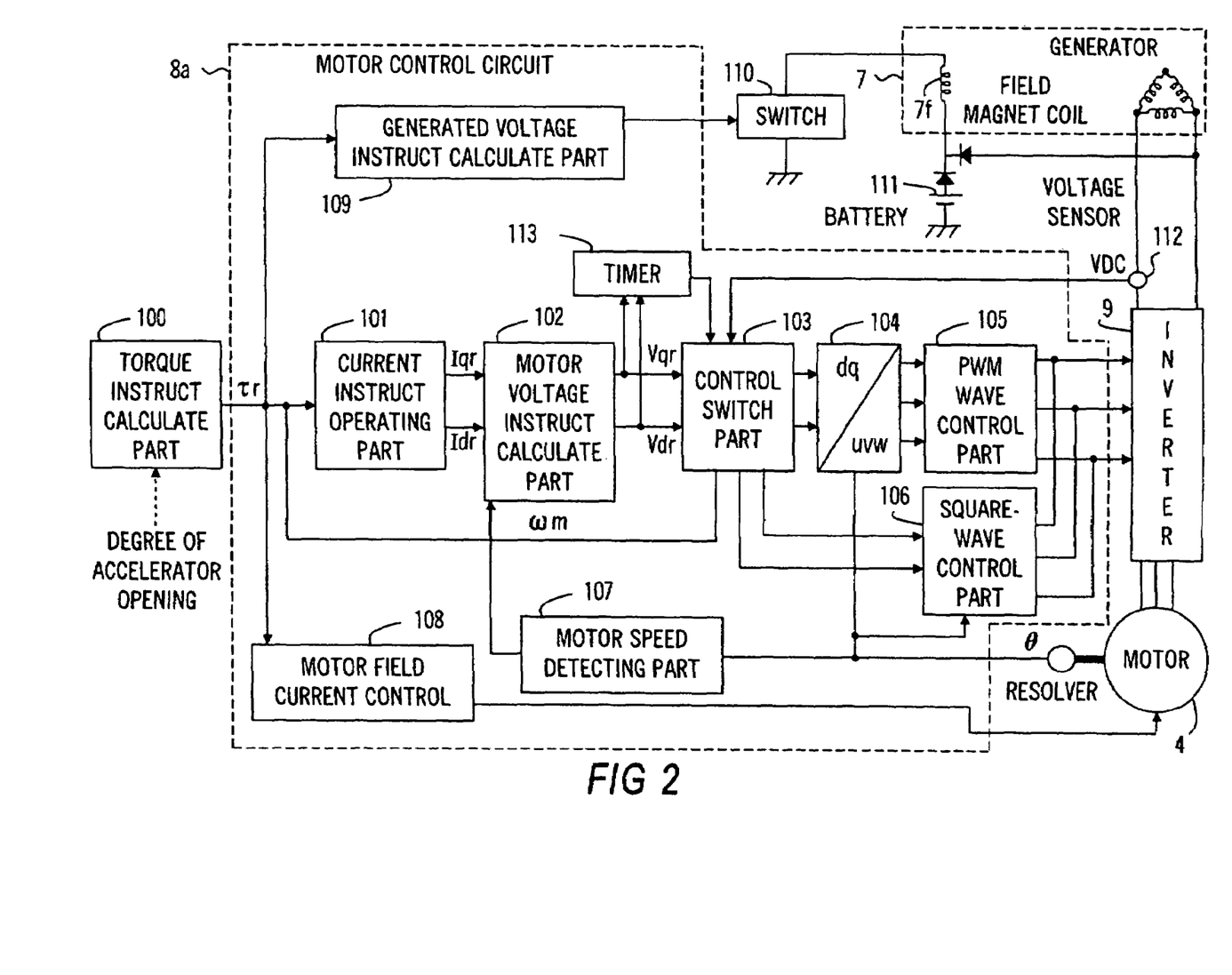
FIG. 2 is a block diagram of the motor control circuit of the first embodiment.

In order to control the driving state of motor 4, a current sensor is installed in junction box 10. The current sensor detects the armature current signal supplied from power generator 7 to motor 4 and outputs it to 4WD controller 8. The voltage of motor 4 is detected by 4WD controller 8. A resolver is connected to the output shaft of motor 4, and the magnetic pole position signal θ of motor 4 is output, as shown in FIG. 2.

The clutch 12 is, for example, a wet multi-plate clutch, which engages/disengages corresponding to an instruction sent from 4WD controller 8. In this embodiment, a wet multi-plate clutch is used as the engaging means. However, it is also possible to use a powder clutch or pump type clutch.

Wheel speed sensors 27FL, 27FR, 27RL, 27RR are arranged on wheels 1L, 1R, 3L, 3R. The wheel speed sensors 27FL, 27FR, 27RL, 27RR output to 4WD controller 8 pulse signals corresponding to the rotation speeds of wheels 1L, 1R, 3L, 3R as detected wheel speed values.

The 4WD controller 8 has an operation processing device, such as a microcomputer. The wheel speed signal detected by each of the wheel speed sensors 27FL-27RR, the output signal of the current sensor in junction box 10, the output signal of the resolver connected to motor 4, and the acceleration opening degree corresponding to the distance the accelerator pedal (not shown in the figure) is pressed down are input to the operation processing device.

The 4WD controller 8 controls the power generation of power generator 7, the relay in junction box 10, motor 4 via inverter 9, and connection of clutch 12 between decelerator 11 and difference gear 13.

FIG. 2 is a block diagram of the motor control circuit 8a that controls motor 4 using inverter 9. Motor control circuit 8a controls motor 4 using inverter 9 based on torque instruction value τr. Torque instruction value τr is calculated by torque instruction value calculation part 100 from a signal such as the input degree of accelerator opening.

The motor control circuit 8a is furnished for 4WD controller 8 and is comprised of current instruction operating part 101, motor voltage instruction operating part 102, control switching part 103, dq/3-phase switching part 104, PWM wave control part 105, square-wave control part 106, motor speed detecting part 107, motor field current control part 108, and generated voltage instruction calculation part 109. A torque instruction value is input to the motor control circuit, which controls the torque T of motor 4 and rotation speed Nm. Also, generated voltage instruction calculation part 109 outputs an instruction value for the essential motor supply voltage, that is, voltage instruction value V* to power generator 7. The voltage generated by power generator 7 is controlled based on this voltage instruction value V*. Basically, the current supplied to field magnet coil 7f is controlled by controlling switch 110 connected to field magnet coil 7f of generator 7. Current is supplied to field magnet coil 7f from generator 7 or battery 111 connected to field magnet coil 7f.

Based on torque instruction value τr, current instruction operating part 101 calculates instruction values Idr, Iqr of the d-axis (magnetic flux component) current and q-axis (torque component) current used for outputting torque according to torque instruction value τr and outputs them to motor voltage instruction operating part 102.

Voltage instruction operating part 102 calculates d-axis voltage instruction value Vdr used for converting d-axis current value Id to d-axis current instruction value Idr and q-axis voltage instruction value Vqr used for converting q-axis current value Iq to q-axis current instruction value Iqr.

Control switching part 103 performs control switching processing to be described below based on torque instruction value τr, motor rotation speed Nm, and generated voltage V to switch between square-wave voltage driving that applies a square-wave voltage to motor 4 and PWM wave voltage driving that applies a PWM wave voltage to motor 4. In this case, motor rotation speed Nm is detected by motor speed detecting part 107 based on the output signal of the resolver connected to motor 4, and generated voltage V is detected by voltage sensor 112.

Upon switching to PWM wave voltage driving in the control switching part 103, dq/3-phase converting part 104 converts dq-axis voltage instruction values Vdr, Vqr into U-phase voltage instruction value Vur, V-phase voltage instruction value Vvr, W-phase voltage instruction value Vwr of the 3-phase coordinate system based on the magnetic pole position signal θ of motor 4 and outputs the results to PWM wave control part 105. PWM wave control part 105 generates a switching signal output to inverter 9 based on the 3-phase voltage instruction values Vur, Vvr, Vwr calculated by dq/3-phase converting part 104. Inverter 9 generates a voltage corresponding to the switching signal and applies the voltage to motor 4 to perform PWM wave voltage driving.

On the other hand, upon switching to square-wave voltage driving in control switching part 103, square-wave control part 106 generates a switching signal output to inverter 9 based on a voltage phase γ calculated using a conventional method from dq-axis current instruction values Idr, Iqr and on the magnetic pole position signal θ of motor 4. Inverter 9 generates a voltage corresponding to the switching signal and applies the voltage to motor 4 to perform square-wave voltage driving. Also, the field current of motor 4 is controlled by motor field current controlling part 108 based on torque instruction value τr.

In FIG. 2, the switching control means is constituted by control switching part 103, and the PWM wave voltage driving means is constituted by dq/3-phase converting part 104 and PWM wave control part 105. The square-wave voltage driving means is constituted by square-wave control part 106, and the voltage lowering means is constituted by generated voltage instruction calculation part 109 and switch 110. Also, the power converting means is constituted by the motor control circuit 8a and inverter 9 shown in FIG. 2. The motor 4 is controlled by another controller separately from 4WD controller 8.

Figure 3:
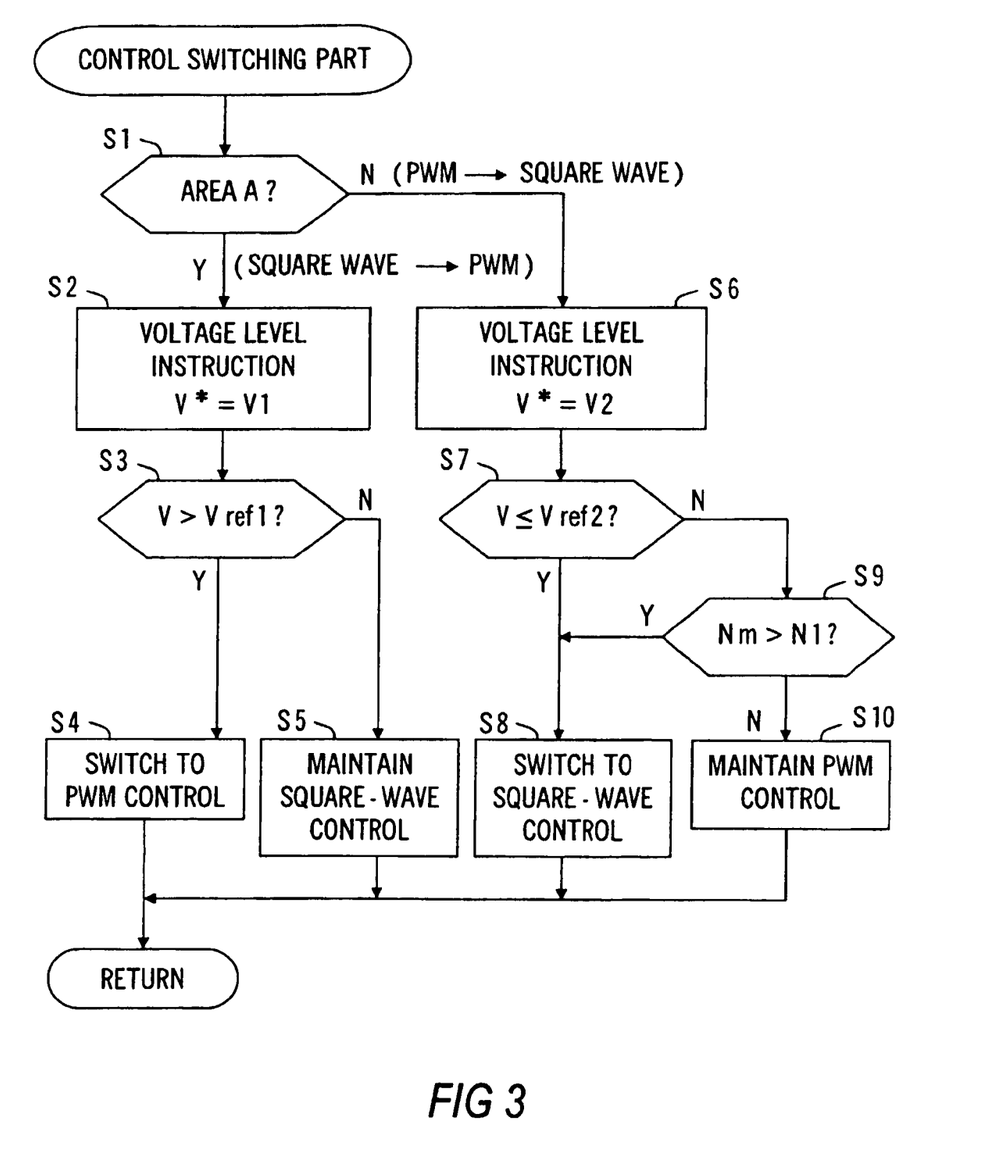
FIG. 3 is a flow chart illustrating the control switching processing in the first embodiment.

FIG. 3 is a flow chart illustrating the control switching processing conducted by control switching part 103. Control switching processing is carried out by a timer-interrupt processing during each specified time period. First, in step S1, switching to PWM wave voltage driving or square-wave voltage driving is determined based on the rotation speed Nm of motor 4 and torque instruction value τr with reference to the PWM/square-wave control map shown in FIG. 4. In the PWM/square-wave control map, area A is the area for PWM wave voltage driving, and area B is the area for square-wave voltage driving. A switching condition exists when the PMW-wave driving is selected but the condition of the vehicle are of a value where square-wave voltage driving is appropriate (that is, in this embodiment, when the rotational speed Nm of motor 4 and torque instruction value τr plot a point in area B).

Figure 4:
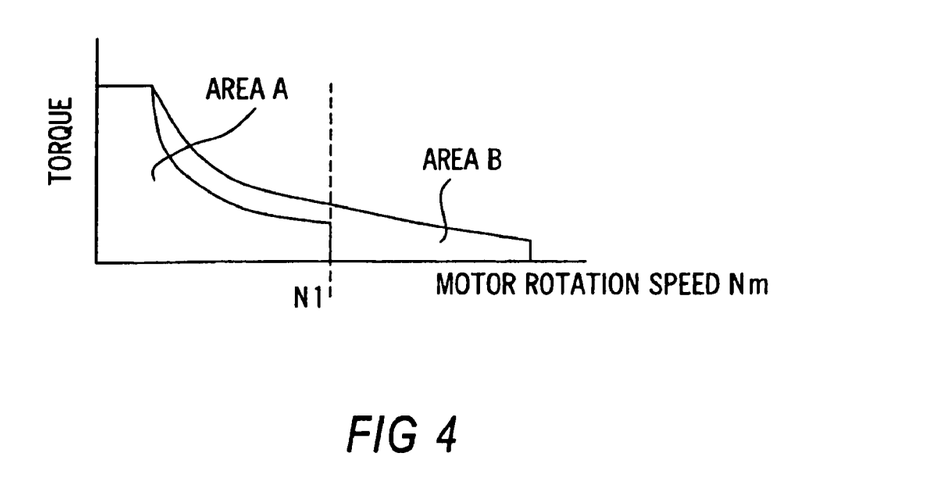
FIG. 4 shows a PWM/square-wave control map.

In general, the advantage of control using square-wave voltage is the high voltage utilization rate compared with the control using PWM wave voltage. High efficiency can be obtained. However, when the torque instruction value τr or the motor rotation speed Nm changes rapidly, its response is poor compared with control using PWM wave voltage. Consequently, in area A where torque instruction value τr and motor rotation speed Nm are small, since the motor output is lower than the highest output, PWM wave voltage driving with a good response property is more appropriate than square-wave voltage driving used for obtaining high output. On the other hand, in area B where torque instruction value τr and motor rotation speed Nm are large, since the motor output is close to the highest output, square-wave voltage driving used for obtaining high output is more appropriate than PWM wave voltage driving with a good response property.

Also, square-wave voltage driving is performed when motor rotation speed Nm exceeds a specified threshold rotation speed N1. In this case, threshold rotation speed N1 is set as the limit value for PWM wave voltage driving. This limit value is set according to the operation processing capability of the 4WD controller, for example. In this case threshold rotation speed N1 is set by the operation processing capability of the 4WD controller. Then, it is determined whether torque instruction value τr and motor rotation speed Nm are in area A for PWM wave voltage driving at step S1 in this way. If they are in area A, the process goes to step S2. If they are in area B, the process goes to step S6, to be described below.

In step S2, the voltage instruction value V* of power generator 7 is changed to instruction value V1(>V2) from instruction value V2. In this case, instruction value V1 is the voltage needed for generating torque under PWM wave voltage driving. Instruction value V2 is the voltage needed for generating torque under square-wave voltage driving. Since square-wave voltage driving has a higher duty ratio and a lower required voltage for generating the same torque as compared with PWM wave voltage driving, V1>V2. Then, in step S3, whether generated voltage V is lower than specified threshold voltage Vref1 is determined. If V>Vref1, the process goes to step S4. In step S4, switching to PWM wave voltage driving occurs, and timer-interrupt processing is ended.

On the other hand, if the judgment result of the step S3 is V≦Vref1, the process goes to step S5. Square-wave voltage driving is maintained, and timer-interrupt processing is ended.

Also, in step S6, the voltage instruction value to power generator 7 is changed from instruction value V1 under PWM wave voltage driving to instruction value V2 under square-wave voltage driving, and the process goes to step S7.

In step S7, whether generated voltage V is lower than the specified threshold voltage Vref2 is determined. If V≦Vref2, the process goes to step S8, in which switching to square-wave voltage driving occurs, and timer-interrupt processing is ended. Here, threshold voltage value Vref2 is the value of specified value α (for example, around 5 V) added to instruction value V2 with square wave voltage driving. That is, threshold voltage value Vref2 is a specified value (for example, 5V) added to the generated voltage of generator 7 in which actual torque does not change even when switched from PWM wave voltage drive to square wave voltage drive.

If the judgment result of the step S7 is V>Vref2, the process goes to step S9, in which whether the rotation speed Nm of the motor is higher than threshold rotation speed N1 is determined. If the judgment result of step S9 is Nm>N1, the process goes to step S8. If the result is Nm≦N1, the process goes to step S10.

In step S10, PWM wave voltage driving is maintained, and timer-interrupt processing is ended.

In the process shown in FIG. 3, the processing of step S1 corresponds to the switching determining means. The processing of step S6 corresponds to the voltage lowering means. The processing of steps S7 and S8 corresponds to the square-wave switching means. The processing of step S9 corresponds to the forcible switching means. In the following, the operation of the aforementioned first embodiment will be explained based on the timing chart shown in FIG. 5.

Figure 5:
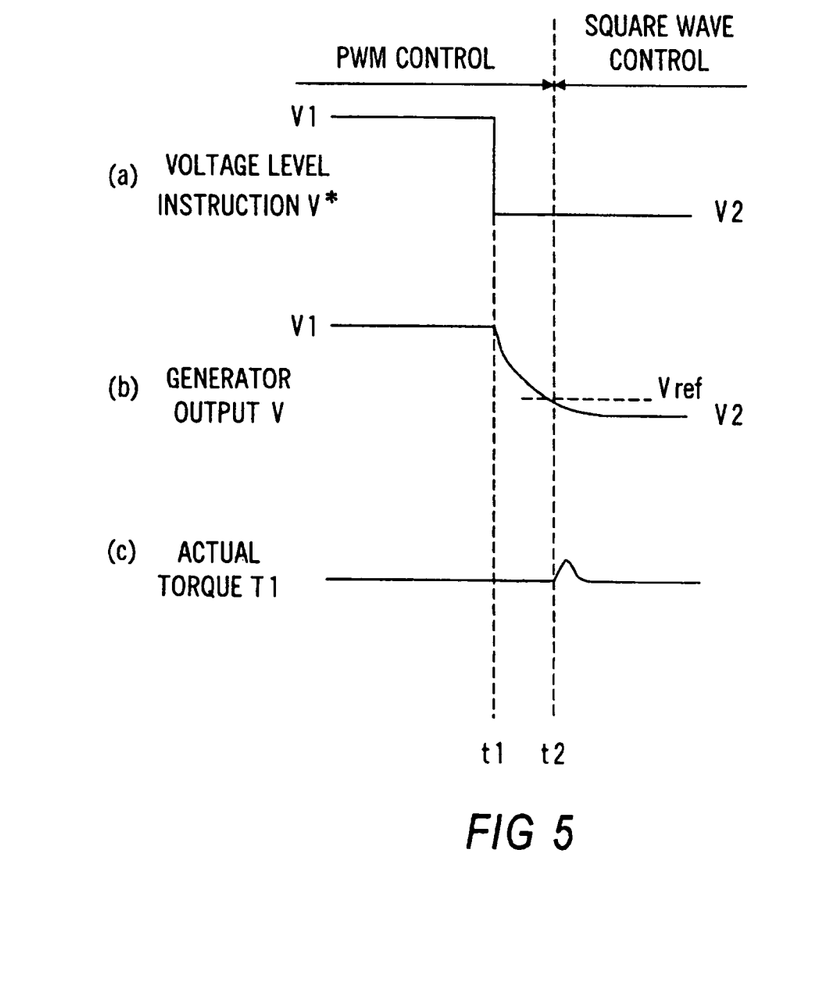
FIG. 5 is a timing chart explaining the operation of the first embodiment.

In FIG. 5, (a) shows the voltage instruction value V* of power generator 7, (b) shows the generated voltage V (generator output V) of power generator 7, and (c) represents the actual torque T1.

At first, torque instruction value τr and motor rotation speed Nm are small and are in the range of area A in the PWM/square-wave control map shown in FIG. 4. In this case, control with a good response property is obtained with PWM wave voltage driving by applying the PWM wave voltage to motor 4 for driving. At this time, voltage instruction value V*=V1.

When motor rotation speed Nm is increased from this state, movement into the range of area B in the PWM/square-wave control map shown in FIG. 4 occurs at time t1. In this case, in the control switching processing shown in FIG. 3, the process goes from step S1 to step S6, and the voltage instruction value V* of power generator 7 is lowered from V1 to V2. At this time, since generated voltage V increases threshold voltage Vref2, the process goes to step S9 depending on the judgment result of step S7. If motor rotation speed Nm is lower than threshold rotation speed N1, the process goes from step S9 to step S10, and PWM wave voltage driving is continued.

However, because of the winding inductance of the power generator, the field current of field magnet coil 7f of power generator 7 has a time constant and gradually decreases, and as shown in FIG. 5(a), even if voltage instruction value V* is lowered from V1 to V2 at time t1, the generated voltage V of the power generator gradually decreases as shown in FIG. 5(b) instead of sharply dropping following voltage instruction value V*. As shown in FIG. 5(c), actual torque T1 does not change even when generated voltage V decreases in this case.

Subsequently, when generated voltage V drops below threshold voltage Vref2 at time t2, the process goes to step S8 depending on the judgment result of step S7, and PWM wave voltage driving is switched to square-wave voltage driving.

Figure 6:
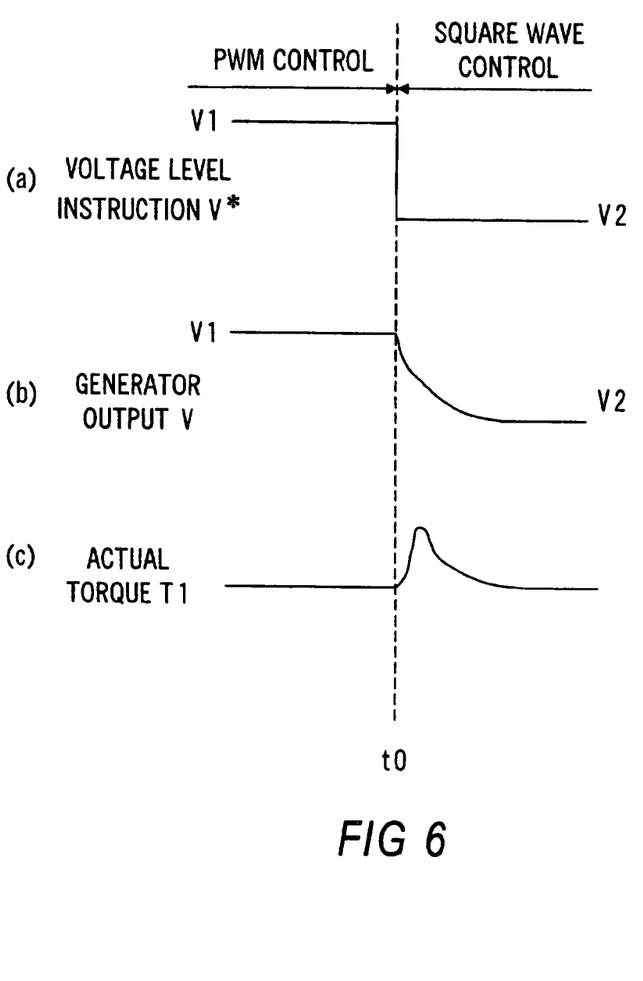
FIG. 6 is a timing chart showing the operation of a motor control device.

FIG. 6 shows the state of each signal if PWM wave voltage driving is switched to square-wave voltage driving at the same time voltage instruction value V* is lowered from V1 to V2. As can be seen from this diagram, when decrease of voltage instruction value V* and switching to square-wave voltage driving are performed simultaneously at time t0, the motor voltage V rises directly at that time point. Since the duty ratio increases sharply as a result of switching to square-wave voltage driving, actual torque T1 increases sharply. As a result, a shock occurs.

In this embodiment, since switching to square-wave voltage driving occurs at the time generated voltage V drops below threshold voltage Vref, as shown in FIG. 5(c), a sharp increase in actual torque T1 can be suppressed even when the duty ratio becomes higher, and the shock caused by torque increase can also be alleviated. On the other hand, after voltage instruction value V* is reduced at t1, generated voltage V rises above threshold voltage Vref. In that state, motor rotation speed Nm rises above threshold rotation speed N1. In this case, the process goes to step S8 depending on the judgment result of step S9 to forcibly switch to square-wave voltage driving.

As described above, in the aforementioned first embodiment, when PWM wave voltage driving switching to square-wave voltage driving is detected, generated voltage V of generator 7 is lowered. Since switching to square-wave voltage driving occurs when the voltage drops below a specified level, the shock caused by the torque increase during switching can be alleviated. Also, when the rotation speed of the motor is detected to be higher than a specified level, forcible switching to square-wave voltage driving occurs. Consequently, malfunctions of PWM wave voltage driving caused by a high rotation speed of the motor can be prevented.

Figure 7:
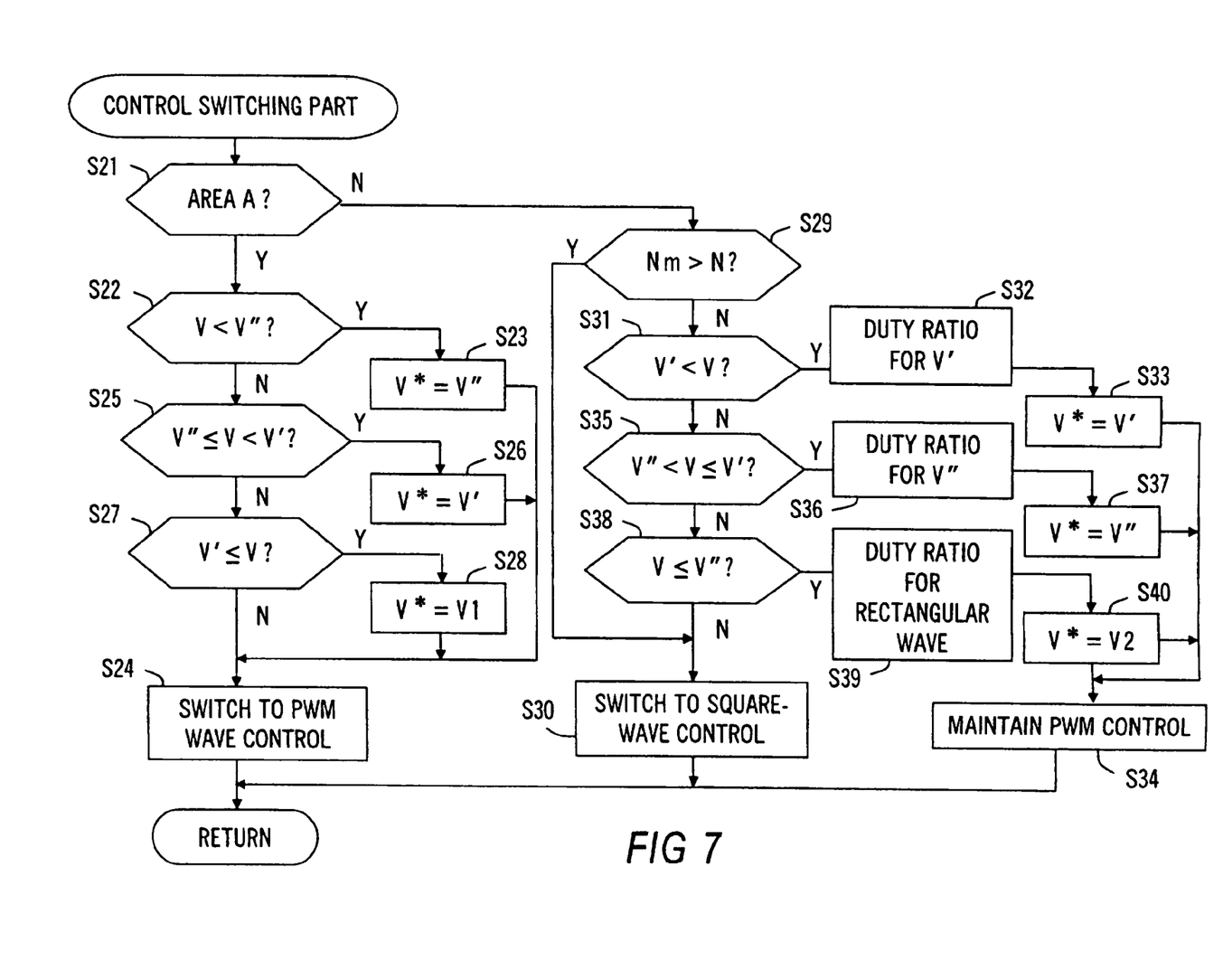
FIG. 7 is a flow chart illustrating the control switching processing in a second embodiment of the invention.

In the following, a second embodiment of the present invention will be explained. In the second embodiment, when switching from PWM wave voltage driving to square-wave voltage driving is identified, the duty ratio is increased stepwise to the duty ratio of square-wave voltage driving, followed by switching to square-wave voltage driving by PWM wave control part 105. In the second embodiment, the control switching processing conducted by control switching part 103 is shown in FIG. 7. As shown, in step S21, switching of PWM wave voltage driving and square-wave voltage driving is determined based on the rotation speed Nm of motor 4 and torque instruction value τr with reference to the PWM/square-wave control map shown in FIG. 4.

Then, it is determined whether torque instruction value τr and motor rotation speed Nm are in area A for PWM wave voltage driving. If they are in area A, the process goes to step S22. If they are in area B, the process goes to step S29. In step S22, whether generated voltage V is lower than second instruction value V" is determined. If V<V", the process goes to step S23, in which the voltage instruction value V* of power generator 7 is changed from instruction value V2 to second instruction value V" (>V2) when the duty ratio is reduced by one step. Then, the process goes to step S24 to switch to PWM wave voltage driving, and timer-interrupt processing is ended.

If the judgment result of the step S22 is V≧V", the process goes to step S25, in which it is determined whether generated voltage V is lower than first instruction value V'. If V"≦V<V', the process goes to step S26, in which voltage instruction value V* of power generator 7 is changed from the second instruction value V" to the first instruction value V'(>V") when the duty ratio is decreased by one step. Then, the process goes to step S24.

If the judgment result of the step S25 is "No," the process goes to step S27, in which it is determined whether generated voltage V is higher than the first instruction value V'. If V≧V', the process goes to step S28, in which the voltage instruction value V8* of power generator 7 is changed from the first instruction value V' to instruction value V1(>V') when the duty ratio is decreased by one step. Also, if the judgment result of the step S27 is V<V', the process goes directly to step S24.

In step S29, whether the rotation speed Nm of the motor is higher than threshold rotation speed N(=N1) is determined. If Nm>N, the process goes to step S30, switching to square-wave voltage driving occurs, and timer-interrupt processing is ended. On the other hand, if the judgment result of the step S29 is Nm≦N, the process goes to step S31, in which whether generated voltage V is higher than the first instruction value V'. If V>V' is determined, the process goes to step S32, and the duty ratio is raised to the duty ratio for V' and the process goes to step S33. At step S33, the power instruction value V* of power generator 7 is changed to the first instruction value V' from instruction value V1 when the duty ratio is increased by one step. Then, the process goes to step S34. In step S34, PWM wave voltage driving is maintained, and timer-interrupt processing is ended.

In this embodiment, when PWM wave voltage driving is switched to square-wave voltage driving, the duty ratio is gradually increased in three steps from the duty ratio of PWM wave voltage driving to the duty ratio of square-wave voltage driving. Switching to square-wave voltage driving is performed at the time point at which the duty ratio reaches the duty ratio of square-wave voltage driving, and generated voltage V reaches V2.

If the judgment result of the step S31 is V≦V', the process goes to step S35, in which whether generated voltage V is higher than the second instruction value V" is determined. If V"<V≦V', the process goes to step S36, in which the duty ratio is raised to the duty ratio for V" and the process goes to step S37. At step S37, the voltage instruction value V* of power generator 7 is changed from the first instruction value V' to the second instruction value V" when the duty ratio is increased by one step. Then, the process goes to the step S34.

If the judgment result of the step S35 is "No," the process goes to step S38, in which whether generated voltage V is lower than the second instruction value V" is determined. If V≦V", the process goes to step S39, in which the duty ratio for V" is raised to the same duty ratio as with square wave voltage drive and the process goes to step S40. At step S40, the voltage instruction value V* of power generator 7 is changed from the second instruction value V" to instruction value V2 when the duty ratio is increased by one step, that is, the same as with square wave voltage drive. Then, the process goes to the step S34. On the other hand, if V>V", the process goes directly to the step S30 to switch to square wave control.

In the processing shown in FIG. 7, the processing of step S29 corresponds to the forcible switching means. The processing of steps S32, S36 and S39 corresponds to the duty ratio changing means. That is, in FIG. 3, control and switching part (103) corresponds to the forcible switching means, and PWM wave control part (105) corresponds to the duty ratio changing means.

Figure 8:
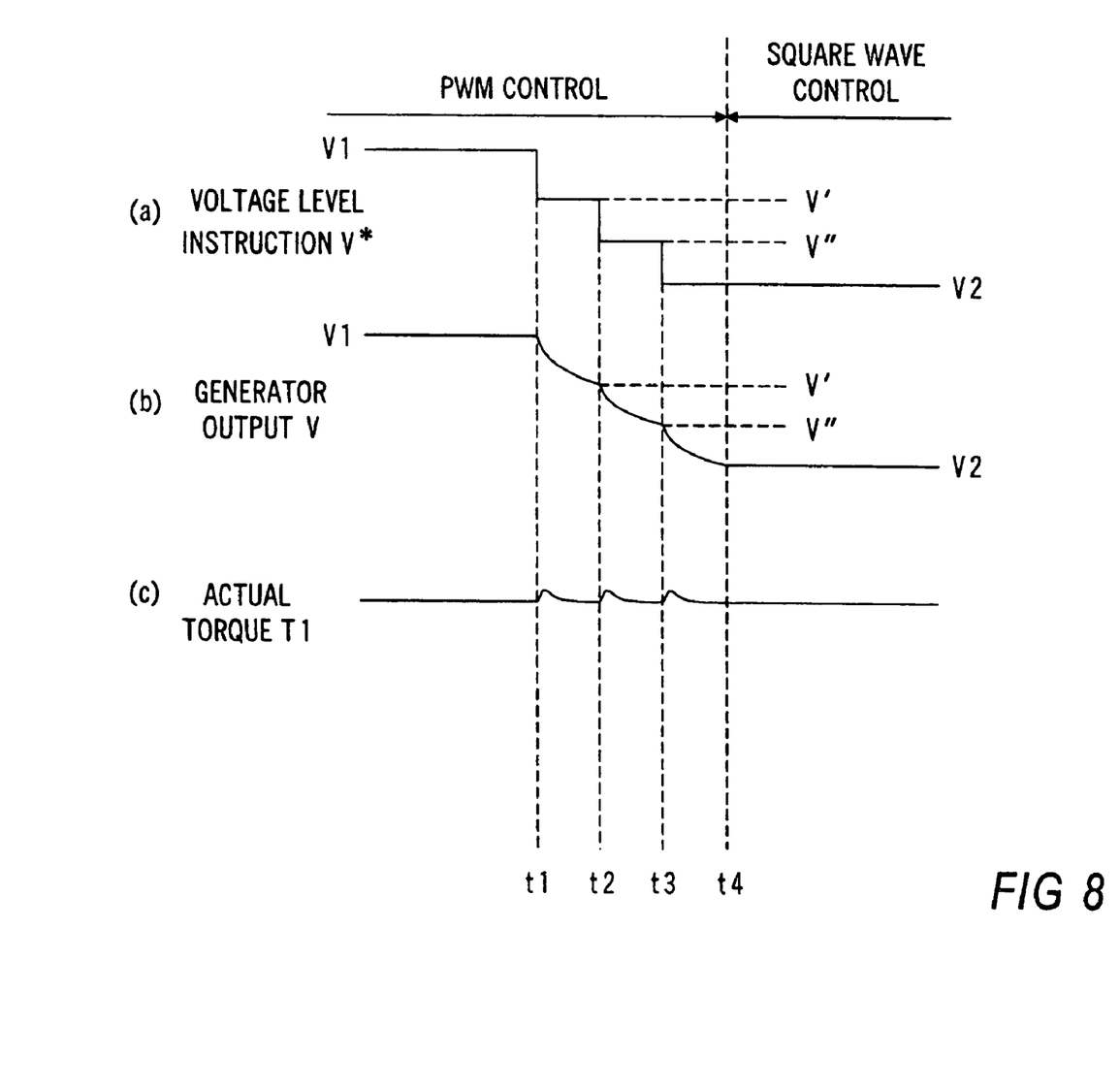
FIG. 8 is a timing chart explaining the operation of the second embodiment.

In the following, the operation of the second embodiment will be explained based on the timing chart shown in FIG. 8. In FIG. 8, (a) shows the voltage instruction value V* of power generator 7, (b) shows the output voltage V of power generator 7, and (c) shows actual torque T1. At first, torque instruction value τr and motor rotation speed Nm are small and are in the range of area A in the PWM/square-wave control map shown in FIG. 4. In this case, control with a good response property is obtained by PWM wave voltage driving by applying the PWM wave voltage to motor 4 for driving. At that time, voltage instruction value V*=V1.

When motor rotation speed Mm increases from this state, movement into the range of area B in the PWM/square-wave control map shown in FIG. 4 occurs at time t1. When motor rotation speed Nm is lower than threshold rotation speed N1, in the control switching processing shown in FIG. 7, the process goes from step S29 to step S32 through step S31, the duty ratio is raised to the duty ratio for V', and the process goes to step S33. At step S33, the voltage instruction value V* of power generator 7 is decreased from instruction value V1 to the first instruction value V' when the duty ratio is increased by one step, and PWM wave voltage driving is continued. In this case, since the duty ratio is increased by one step, the increase in actual torque T1 is less than the increase of actual torque T1 shown in FIG. 6(c).

Subsequently, generated voltage V drops accompanying the drop in the voltage of power generator 7. When V=V'' at time t2, the process goes to step S36 depending on the judgment made in step S35, the duty ratio is raised to the duty ratio for V'', and the process goes to step S37. At step S37, the power instruction value V* of power generator 7 is decreased from the first instruction value V' to the second instruction value V'' when the duty ratio is increased by one step, and PWM wave voltage driving is continued.

When the duty ratio is increased one step at a time and motor voltage V reaches instruction value V2 at time t4, PWM wave voltage driving is switched to square-wave voltage driving. At that time, since the duty ratio reaches the duty ratio of square-wave voltage driving, no increase in actual torque T1 occurs.

As described above, in the second embodiment, when switching occurs from PWM wave voltage driving to square-wave voltage driving, the duty ratio is gradually increased while the generated voltage is lowered. Therefore, a sharp increase in the motor voltage can be alleviated during switching of the duty ratio so that the shock caused by torque increase during switching to square-wave voltage driving can be reduced.

The aforementioned second embodiment explained a case in which the duty ratio is increased in three steps during switching from PWM wave voltage driving to square-wave voltage driving. However, it is also possible to increase the duty ratio smoothly or in any number of steps. The finer the timing for switching of the duty ratio, the smaller the torque variation.

Also, in the aforementioned second embodiment, in the case of switching from PWM wave voltage driving to square-wave voltage driving, switching to square-wave voltage driving is performed at the time point at which the generated voltage reaches the instruction value for square-wave voltage driving. However, it is also possible to switch to square-wave voltage driving at the time point at which the generated voltage reaches a specified threshold voltage as described in the first embodiment.

In the aforementioned second embodiment, during switching from PWM wave voltage driving to square-wave voltage driving, the voltage instruction value sent to the power generator is decreased according to the timing of increase in the time ratio. However, it is also possible to decrease the voltage instruction value sent to the power generator from instruction value V1 at time t1 to instruction value V2 as shown in FIG. 8, monitor generated voltage V, and increase the duty ratio stepwise.

Figure 9:
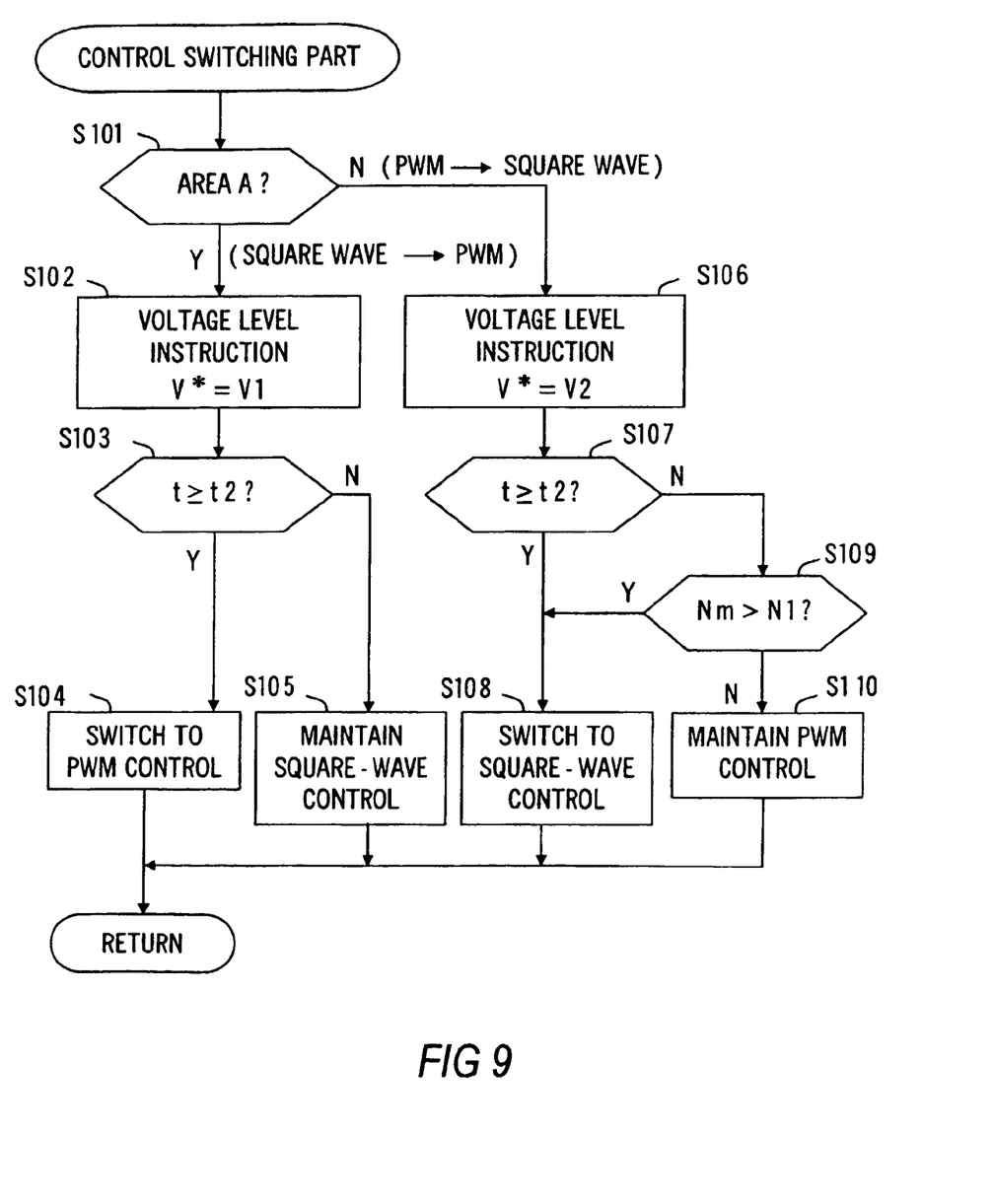
FIG. 9 is a flow chart showing control and switching processing in a third embodiment.

Next, a third embodiment of the present invention will be explained. This third embodiment estimates time t2 at which generated voltage V of generator 7 reaches Vref2 with PWM wave control part 105 when switching from PWM wave voltage drive to square wave voltage drive is determined and switches from PWM wave voltage drive to square wave voltage drive due to time t2 being reached with timer 113. Time t2 at which generated voltage V of generator 7 reaches Vref2 can be estimated from the deviation between the generated voltage of generator 7 and the voltage instruction value and from the time constant of field magnet coil 7f of generator 7.

FIG. 9 is a flow chart showing the control and switching processing executed by control and switching part 103. This control and switching processing is executed using timer-interrupt processing at a specified time interval. First, at step S101, the PWM/square wave control map shown in FIG. 4 is referenced and switching between PWM wave voltage drive and square wave voltage drive is judged based on the motor 4 rotation speed Nm and torque instruction value τr. In the PWM/square wave control map, region A is the region in which PWM wave voltage drive is performed and region B is the region in which square wave voltage drive is performed.

Then, it is determined whether torque instruction value τr and motor rotation speed Nm are in region A in which PWM wave voltage drive is performed. When in region A, the process goes to step S102, and when in region B, the process goes to step S106 described below.

At step S102, voltage instruction value V* for generator 7 is changed from instruction value V2 to instruction value V1(>V2). Next, as step S103, it is determined whether time t of timer 113 furnished for motor control circuit 8a is time t2 or greater. When t≧t2, the process goes to step S104. Here, time t2 is calculated from the deviation between generated voltage V of generator 7 and threshold voltage value Vref1 and from the time constant of field magnet coil 7f of generator 7. At step S104, driving is switched to PWM wave voltage drive and timer-interrupt processing is completed.

On the other hand, when the result determined at aforementioned step S103 is that t<t2, the process goes to step S5, and after square wave voltage driving is maintained, timer-interrupt processing is completed.

At step S106, the threshold voltage value of generator 7 is changed from threshold value V1 with PWM wave voltage drive to threshold value V2 with square wave voltage drive, and the process goes to step S107.

At step S107, it is determined whether time t is specified time t2 or greater. When t≧t2, the process goes to step S108, and after switching to square wave voltage driving, timer-interrupt processing is completed. Here, time t2 is calculated from the deviation between generated voltage V of generator 7 and threshold voltage value Vref2 and from a physical property of generator 7 (in this case, the time constant of field magnet coil 7f of generator 7).

When the result determined at aforementioned step S107 is that t<t2, the process goes to step S109 and it is determined whether the motor rotation speed Nm has exceeded threshold rotation speed value N1. When the result determined at step S109 is that Nm>N1, the process goes to aforementioned step S108. When Nm≦N1, the process goes to step S110.

At step S110, after PWM wave voltage driving is maintained, timer-interrupt processing is completed.

In the process of FIG. 9, the process at step S101 corresponds to the switching judgment means, that at step S106 corresponds to the voltage lowering means, that step S107 corresponds to the voltage reduction detection means, that at step S108 corresponds to the square-wave switching means, and that at step S109 corresponds to the forcible switching means. The operation of the aforementioned third embodiment is the same as the first embodiment.

The aforementioned first through third embodiments explain cases in which power is supplied from a power generator driven by an internal combustion engine that drives the main drive wheels. The present invention, however, is not limited to this. It is also applicable to a vehicle in which the drive wheels are not driven by this type of engine. Also, the processing of controller 8 may be distributed in more than one physical processor.

The above-disclosed embodiments have been described in order to allow easy understanding of the present invention. The invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

This application is based on Japanese Patent Application No. 2004-362451, filed Dec. 15, 2004 in the Japanese Patent Office, the entire contents of which are hereby incorporated by reference and on Japanese Patent Application No. 2005-327148 filed Nov. 11, 2005, the entire contents of which are hereby incorporated by reference.

What is claimed is:

1. A motor control device for use in controlling an electric motor driven by a power generator that is adapted to output a square-wave voltage and a PWM-wave voltage in response to a switching control signal, comprising:
    (a) a first input adapted to receive a signal indicative of a torque instruction value;
    (b) a second input adapted to receive a signal indicative of the rotational speed of the electric motor; and
    (c) a controller responsive to the first and second inputs and adapted to: determine the existence of a switching condition based on the first and second inputs; if a switching condition exists, generate a voltage control signal to lower the output voltage of the power generator; when the output voltage of the power generator is below a specified voltage level, generate the switching control signal to cause the power generator output to switch from the PWM-wave voltage output to the square-wave voltage output.

2. The motor control device of claim 1, wherein the controller is further adapted to gradually increase the duty ratio for the power generator's PWM-wave voltage output when a switching condition exists.

3. The motor control device of claim 1, wherein the controller is further adapted to generate the switching control signal to cause the power generator output to switch from the PWM-voltage output to the square-wave voltage output in response to the rotational speed of the motor exceeding a specified rotational speed.

4. The motor control device of claim 1, wherein the controller is further adapted to judge that the output voltage of the power generator is below a specified voltage level if a specified time period has elapsed.

5. The motor control device of claim 4, wherein the specified time period is based on a physical property of the power generator and a measure of the deviation between the specified voltage level and the output voltage of the power generator.

6. The motor control device of claim 5, wherein the physical property of the power generator is a time constant of a field magnet coil in the power generator.

7. A motor control device that controls an alternating current motor that drives the driving wheels of a vehicle based on a torque command value, comprising:
    (a) a power generator driven by an internal combustion engine and adapted to supply power to the alternating current motor;
    (b) a motor velocity sensing device that detects the rotational speed of the alternating current motor;
    (c) an inverter that is disposed between the power generator and the alternating current motor;
    (d) a square-wave voltage driver that controls the inverter to produce a square-wave voltage from the power generated by the power generator, and applies the square-wave voltage to the alternating current motor to put the alternating current motor in a square-wave voltage-driven state;
    (e) a pulse-width-modulated wave driver that controls the inverter to produce a pulse-width-modulated wave voltage from the power generated by the power generator, and applies the pulse-width-modulated wave voltage to the alternating current motor to put the alternating current motor in a pulse-width-modulated wave voltage-driven state;
    (f) a switching decision section that determines that the conditions for switching from the pulse-width modulated wave voltage-driven state to the square-wave voltage-driven state have been met based on the rotational speed of the alternating current motor detected by the motor velocity sensing device;
    (g) a voltage controller that decreases the voltage generated by the power generator when the switch controller has determined that the conditions for switching from the pulse-width modulated wave voltage-driven state to the square-wave voltage-driven state have been met;
    (h) a voltage sensor that detects that the voltage generated by the power generator has dropped below a specified voltage threshold value; and
    (i) a square switching section to switch from the pulse-width modulated wave voltage-driven state to the square-wave voltage-driven state when the switching decision section has determined that the conditions for switching from the pulse-width modulated wave voltage-driven state to the square-wave voltage-driven state have been met, and when the voltage sensor has detected that the voltage generated by the power generator has dropped below the specified voltage threshold value.

8. The motor control device of claim 7, further comprising: a duty ratio changing module adapted to gradually increase the duty ratio of the pulse-width-modulated wave voltage when the switching decision section has determined that the conditions for switching from the pulse-width modulated wave voltage-driven state to the square-wave voltage-driven state have been met.

9. The motor control device of claim 7, further comprising: a forcible switching module that switches from the pulse-width modulated wave voltage-driven state to the square-wave voltage-driven state when the motor velocity sensing device has detected that the rotational speed of the alternating current motor has exceeded a specified threshold value.

10. The motor control device of claim 7, wherein the power generator has a magnetic field coil that is adapted for connection to a current source, and the voltage controller decreases the voltage generated by the power generator by decreasing the current supplied to the magnetic filed coil.

11. The motor control device of claim 7, wherein the voltage sensor is a generated voltage sensing device that detects the voltage generated by the power generator.

12. The motor control device disclosed in claim 7, further comprising a timer that measures the time elapsed from when the generated voltage is initially decreased by the voltage controller, and by the voltage sensor determines that the voltage generated by the power generator is below the specified voltage threshold value when the timer has detected that the specified time had elapsed.

13. A vehicle, comprising:
    (a) an electric motor;
    (b) power generator that is adapted to drive the electric motor with a square-wave output and a PWM-wave output in response to a switching control signal;
    (c) a first input signal indicative of a torque instruction value;

(d) a second input signal indicative of the rotational speed of the electric motor; and (e) a controller adapted to: determine the existence of a switching condition based on the first and second inputs; if a switching condition exists, lower the output voltage of the power generator; when the output voltage of the power generator is below a specified voltage level, generate the switching control signal to cause the power generator output to switch from the PWM-wave output to the square-wave output.

14. The vehicle of claim 13, wherein the controller is further adapted to gradually increase the duty ratio for power generator's PWM-wave voltage output when a switching condition exists.

15. The vehicle of claim 13, where in the controller is further adapted to generate the switching control signal to cause the power generator to switch from a PWM-voltage output to a square-wave voltage output when the rotational speed of the motor exceeds a specified rotational speed.

16. The vehicle of claim 13, wherein the controller is further adapted to determine that the output voltage of the power generator is below a specified voltage level if a specified time period has elapsed.

17. The vehicle of claim 16, wherein the specified time period is based on a time constant of a field magnet coil in the power generator and a measure of the deviation between the specified voltage level and the voltage level of the power generator output.

18. A motor control device that controls an alternating current motor that drives the driving wheels of the vehicle based on a torque command value, comprising:

(a) a power generating means for generating power to the alternating current motor;

(b) motor velocity sensing means for detecting the rotational speed of the alternating current motor;

(c) square-wave voltage driving means for producing square-wave voltage from the power generated by the power generating means and applying the square-wave voltage to the alternating current motor to put the alternating current motor in a square-wave voltage-driven state;

(d) pulse-width-modulated wave driving means for producing a pulse-width-modulated wave voltage from the power generated by the power generating means and applying the pulse-width-modulated wave voltage to the alternating current motor to put the alternating current motor in a pulse-width-modulated wave voltage-driven state;

(e) switching decision means for determining that the conditions for switching from the pulse-width modulated wave voltage-driven state to the square-wave voltage-driven state have been met based on the rotational speed of the alternating current motor detected by the motor velocity sensing means;

(f) voltage decreasing means for decreasing the voltage generated by the power generating means when the switching decision means has determined that the conditions for switching from the pulse-width modulated wave voltage-driven state to the square-wave voltage-driven state have been met;

(g) voltage decrease sensing means for detecting that the voltage generated by the power generating means has dropped below a specified voltage threshold value; and (h) a square-wave switching means for switching from the pulse-width modulated wave voltage-driven state to the square-wave voltage-driven state when switching decision means has determined that the conditions for switching from the pulse-width modulated wave voltage-driven state to the square-wave voltage-driven state have been met, and when the voltage decrease sensing means has detected that the voltage generated by the power generating means has dropped below the specified voltage threshold value.

19. The motor control device of claim 18, further comprising:

a duty ratio changing means for gradually increasing the duty ratio of the pulse-width-modulated wave voltage when the switching decision means has determined that the conditions for switching from the pulse-width modulated wave voltage-driven state to the square-wave voltage-driven state have been met.

20. The motor control device of claim 18, further comprising:

forcible switching means for switching from the pulse-width modulated wave voltage-driven state to the square-wave voltage-driven state when the motor velocity sensing means has detected that the rotational speed of the alternating current motor have exceeded a specified threshold value.

21. The motor control device of claim 18, wherein the power generator has a magnetic field coil that is adapted for connection to a current source, and the voltage decreasing means decreases the voltage generated by the power generating means by decreasing the current supplied to the magnetic field coil.

22. The motor control device disclosed in claim 18, wherein the voltage decrease sensing means is a generated voltage sensing device that detects the voltage generated by the power generating means.

23. The motor control device disclosed in claim 18, further comprising a timer means for measuring the time elapsed from when the generated voltage is initially decreased by the voltage decreasing means, and by the voltage decrease sensing means determines that the voltage generated by the power generating means is below the specified voltage threshold value when the timer means has detected that the specified time had elapsed.

24. A method for controlling an electric motor driven by a power generator that is adapted to output a square-wave voltage and a PWM wave voltage, comprising:

(a) determining whether a switching condition exists based on the rotation speed of the electric motor and a torque instruction value;

(b) lowering the voltage output of the power generator if a switching condition exists; and (c) switching the output of the power generator from PWM-wave voltage to square-wave voltage if a switching condition exists and the output of the power generator is below a specified level.

25. The method of claim 24, further comprising:

gradually increasing the duty ratio for the PWM-wave voltage output when a switching condition exists.

26. The method of claim 24, further comprising:

switching the output of the power generator from the PWM-wave voltage output to the square-wave voltage output when the rotation speed of the electric motor exceeds a specified rotation speed.

27. The method of claim 24, further comprising:

determining that output of the power generator is below a specified level once a specified time period has elapsed, wherein the specified time period is based on a time constant of a field magnet coil in the power generator and a measure of the deviation between the specified voltage level and the voltage level of the power generator output.

* * * * *